United States Patent [19]

Grolig et al.

[11] Patent Number: 4,855,186
[45] Date of Patent: Aug. 8, 1989

[54] COATED PLASTIC FILM AND PLASTIC LAMINATE PREPARED THEREFROM

[75] Inventors: Gerhard Grolig, Pfungstadt; Guenther Schmidt, Niedernhausen, both of Fed. Rep. of Germany

[73] Assignee: Hoechst Aktiengesellschaft, Fed. Rep. of Germany

[21] Appl. No.: 159,618

[22] Filed: Feb. 23, 1988

[30] Foreign Application Priority Data

Mar. 6, 1987 [DE] Fed. Rep. of Germany ....... 3707214

[51] Int. Cl.⁴ .................. B32B 7/02; B32B 15/08; B32B 27/36
[52] U.S. Cl. ................................ 428/216; 428/332; 428/337; 428/437; 428/458; 428/461; 428/480
[58] Field of Search ............. 428/463, 461, 698, 458, 428/216, 480, 332, 337; 427/160

[56] References Cited

U.S. PATENT DOCUMENTS

| | | | |
|---|---|---|---|
| 4,465,736 | 8/1984 | Nishihara et al. | 428/458 X |
| 4,548,691 | 10/1985 | Dietrich et al. | 427/160 X |
| 4,649,088 | 3/1987 | Mitsui et al. | 428/698 X |
| 4,659,611 | 4/1987 | Iwase et al. | 428/698 X |
| 4,710,426 | 12/1987 | Stephens | 428/463 X |

*Primary Examiner*—Thomas J. Herbert
*Attorney, Agent, or Firm*—Gregory N. Clements

[57] ABSTRACT

A coated plastic film 5 possessing high transmittance for visible light and high reflectance for heat radiation is disclosed which comprises a carrier film 1 of a transparent polymer and a reflection metal layer 3 embedded between two dielectric layers 2 and 4. The reflection metal layer 3 is formed from a metal selected from the group comprising silver, gold, and copper, whereas dielectric layers 2 and 4 are metal nitride layers.

This coated plastic film may be coated on each side with a polyvinyl butyral film to form a plastic laminate which is itself a constituent of a laminated safety glass pane.

10 Claims, 2 Drawing Sheets

COATED PLASTIC FILM AND PLASTIC LAMINATE PREPARED THEREFROM

BACKGROUND OF THE INVENTION:

The present invention relates to a transparent coated plastic film of high transmittance for visible light and high reflectance for infrared radiation comprising a carrier film of a transparent polymer and a reflection metal layer embedded between two dielectric layers, and to a plastic laminate prepared therefrom.

Transparent coated plastic films are used as transparent heat reflectors, which are to be understood as optical filters which reflect infrared or heat radiation and are transparent to visible light, i.e. radiation in the visible region of the electromagnetic spectrum.

Such transparent heat filters should transmit the greatest possible proportion of visible light and reflect the greatest possible proportion of the incident heat radiation. These filters may be employed to prevent heating of the interior of a room by solar radiation.

In recent years, the automotive industry endeavoured to reduce the fuel consumption of motor vehicles. This is accomplished primarily by a marked reduction in the drag coefficients of the vehicles since, as is known, by far the major part of the energy required for moving the vehicle is needed for overcoming the air resistance. In the course of this development, the glass areas of the motor vehicles keep increasing in size and the laminated glass panes are thus arranged at increasing angles. As a consequence, the known "greenhouse effect" in the vehicle interior manifests itself much more strongly, especially in the summer months. In motor vehicles which are left to stand for four hours at an external temperature of, for example, 35° C. in the sun, temperatures of up to 75° C. are measured in the vehicle interior. An overheated interior represents a serious physical and psychic stress for the occupants of the vehicle, especially the driver, and is thus a factor in reducing road safety.

One way of preventing an undue rise of the temperatures in the vehicle interior, even in summer, is to provide the glass panes of the vehicle with a coating, which has a high transparency in the visible spectral region and is strongly reflecting throughout the infrared region.

U.S. Pat. No. 4,548,691 discloses a process for the manufacture of glass panes of high transmittance behavior in the visible region and high reflection behavior towards heat radiation in which flat glass panes are directly coated by cathodic sputtering. A first layer of the group comprising $In_2O_3$, $SnO_2$ or mixed oxides thereof is produced on the flat glass panes. A second layer of silver, a third layer of the group comprising Al, Ti, Ta, Cr, Mn and Zr and a fourth layer of the group comprising $In_2O_3$, $SnO_2$ or mixed oxides thereof are applied to this first layer. Transparent heat reflectors can be produced in this way, but the process has disadvantages: it is very involved and expensive to coat individual glass panes. A further difficulty is that, to manufacture windshields for motor vehicles, the flat, coated glass panes must undergo an additional bending process, which adversely affects the quality of the coating. Furthermore, a coating, which manages without the layer which serves purely to protect the second layer of silver, is desirable.

U.S. Pat. No. 4,465,736 discloses a light-transmitting film comprising a transparent polymer carrier film and a light-transmitting metal layer of a metal from the group comprising Ag, Au, Cu and alloys thereof. A dielectric layer of titanium, bismuth, tungsten, indium, zirconium or silicon oxide is applied to one or both sides of the metal layer. In addition, a protective layer of Ti, Zr, Se or C can also be formed on one or both sides of the metal layer. The light-transmitting film is bonded on both sides to polyvinyl butyral to give a laminate which is, for example, inserted between two glass panes and integrated with the latter to form a laminated safety glass pane.

The carrier film of the laminate is in general composed of polyethylene terephalate. The two dielectric layers applied to both sides of the metal layer are precipitated on the metal layer, for example, by hydrolysis of tetrabutyl titanate in alcohol.

It is an object of the present invention to provide an improved transparent coated plastic film of high transmittance for visible light and high reflectance for IR radiation which does not require a protective layer for the silver layer. Another object of the present invention is to provide a heat reflecting, transparent coated plastic film which is an essential constituent of a laminate in a laminated safety glass, which can be processed with equal ease and by the same methods as a conventional polyvinyl butyral film.

BRIEF SUMMARY OF THE INVENTION

In one aspect, the present invention relates to a coated plastic film possessing a high transmittance for visible light and a high reflectance for infrared radiation comprising a transparent plastic carrier film having a transparent heat reflection layer on at least one surface, said transparent heat reflection layer consisting of (a) a first dielectric layer adherent to the surface of said carrier film, said first dielectric layer comprising a metal nitride;

(b) a heat reflection metallic layer adherent to said first dielectric layer; and (c) a second dielectric layer adherent to said heat reflection metallic layer, said second dielectric layer comprising a metal nitride.

In another aspect, the present invention relates to a plastic laminate possessing a high transmittance for visible light and a high reflectance for infrared radiation comprising two layers of polyvinyl butyral separated by a transparent plastic carrier film having a transparent heat reflection layer on at least one surface, said transparent heat reflection layer consisting of (a) a first dielectric layer adherent to the surface of said carrier film, said first dielectric layer comprising a metal nitride;

(b) a heat reflection metallic layer adherent to said first dielectric layer; and (c) a second dielectric layer adherent to said heat reflection metallic layer, said second dielectric layer comprising a metal nitride.

In yet another aspect, the present invention relates to a coated plastic film possessing a high transmittance for visible light and a high reflectance for infrared radiation comprising a transparent plastic carrier film having a transparent heat reflection layer on at least one surface, said transparent heat reflection layer consisting of (a) a heat reflection metallic layer adherent to the surface of said film;

(b) a dielectric adherent to said heat reflection metallic layer, said dielectric layer comprising a metal nitride.

DETAILED DESCRIPTION OF THE INVENTION

Figure 1:
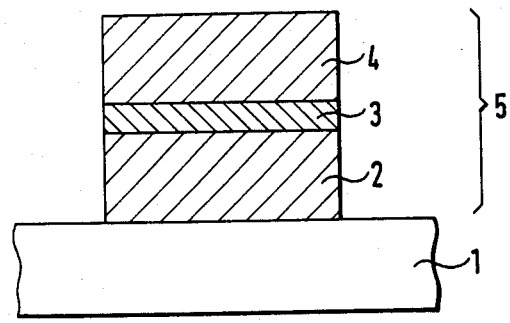
FIG. 1 shows a cross-section through a coated plastic film according to the invention.

The objects of the present invention are achieved when each of the two dielectric layers is composed of a metal nitride. In an embodiment of the invention, the heat reflection metal layer is composed of a metal from the group comprising silver, gold and copper. The dielectric layers are preferably composed of aluminum nitride or silicon nitride.

In an embodiment of the invention, the reflection metal layer has a thickness of from 5 to 40 nm and the thickness of each of the dielectric layers is from 20 to 60 nm. The carrier film comprises, for example, polyethylene terephthalate having a thickness of from 5 to 100 $\mu$m. The transparency of the coated plastic film in the visible spectral region for a wavelength of 550 nm is greater than or equal to 73% and the reflectance of the coated plastic film in the near infrared region for a wavelength of 2500 nm is at least 80%.

The layers are applied successively to the carrier film by cathodic sputtering. The coated plastic film is the starting material for a plastic laminate and, for this purpose, each of the two sides of the plastic film are laminated with a film of polyvinyl butyral. The thickness of the individual polyvinyl butyral film is typically in the range of from 0.2 to 0.8 mm. This plastic laminate embedded between the two shaped glass panes forms with these a laminated safety glass pane of glass/plastic laminate/glass structure. Such laminated safety glass panes are, in particular, fitted as windshields in motor vehicles.

High reflection in the infrared region is a characteristic property of metals of high electric conductivity. The light transmission in the visible spectral region is in turn typical of semiconductors having a band gap $E \geqq 3$ eV. Usually, transparent heat reflectors can be produced in two ways, either by means of semiconductors, which have a large band gap and a non-stoichiometric composition and/or have been suitably doped, as the layer material' or by means of very thin metal layers which have a thickness of the order of 10 nm or less and are provided on both sides with a dielectric layer. The first method of production requires layer thicknesses of about 1 $\mu$m and higher, which are too large to make them suitable for use in windshields. For this reason, only that embodiment can be used for transparent heat reflectors in laminated safety glass panes for motor vehicles, wherein very thin metal layers, which are provided on both sides with a dielectric layer, can be used.

Metals suitable for this metal layer are primarily silver, gold, and copper, and alloys of these metals. At wavelengths less than 600 nm, i.e. in a region where the solar spectrum has its maximum, the absorptivity of copper and gold is substantially greater than that of silver. The reduced light transmission of a silver layer in the visible spectral region is to be ascribed to the higher reflectance of silver as compared with gold and copper. The high reflectance of the silver layer in the visible spectral region is reduced by embedding the silver layer between two dielectric anti-reflection layers. Dielectric materials believed useful for the anti-reflection layers are metal oxides or metal nitrides.

If the carrier film, namely the polyester film, is first coated with a metal oxide layer and then with a silver layer of a layer thickness of less than 25 nm, the measured optical properties, such as the reflectance and transmittance, more or less coincide with the theoretical predictions. If a further oxide layer is applied to the silver layer, the coated film has a light transmission of about 75% and - contrary to expectation - a reflectance for heat radiation of only 35% as a maximum. Investigations using a scanning electron microscope and an electron spectroscopy instrument for the chemical analysis of surfaces (ESCA instrument) show that, when the top metal oxide layer is applied, the initially closed silver layer is torn open by the action of the cathodic sputtering process when the top metal oxide layer is applied, i.e. mutually isolated drop-shaped "silver mounds" of a diameter of about 1 $\mu$m are formed. As a result, the reflectance of a polyester film coated in this way is markedly reduced. This mechanism is described in U.S. Pat. No. 4,548,691.

Prior artisans have prevented the tearing of the silver layer by applying an additional metal layer between the silver layer and the top metal oxide layer. Transparent heat reflectors can be produced in this way, wherein the individual layers are each applied by cathodic sputtering.

By contrast, the transparent heat reflectors prepared according to the invention manage without this additional metal layer.

Illustrative examples of the invention are explained in more detail below by reference to the drawings.

FIG. 1 shows a cross-section of a coated plastic film 5 composed of a carrier film 1 and a layer structure thereon, which comprises several layers. A first metal nitride layer, a metal layer and a second metal nitride layer have been applied to the carrier film 1 by cathodic sputtering. The carrier film 1 is a polyester film, for example, polyethylene terephthalate film, having a thickness of from 10 to 50 $\mu$m. Dielectric layers 2 and 4 are comprised of a metal nitride and form anti-reflection layers which enclose the metal layer 3. The thickness of each of the dielectric metal layers is in the range of from 20 to 60 nm. The metal nitride of the two dielectric layers 2 and 4 is preferably aluminum nitride. The metal layer 3 forms a heat reflection metal layer and is composed of a metal from the group comprising silver, gold and copper, with silver being preferred. The metal layer 3 has in general a thickness of from 5 to 40 nm.

Dielectric layers 2 and 4 can also be composed of silicon nitride, rather than aluminum nitride, each having a thickness of from 20 to 60 nm.

Figure 2:
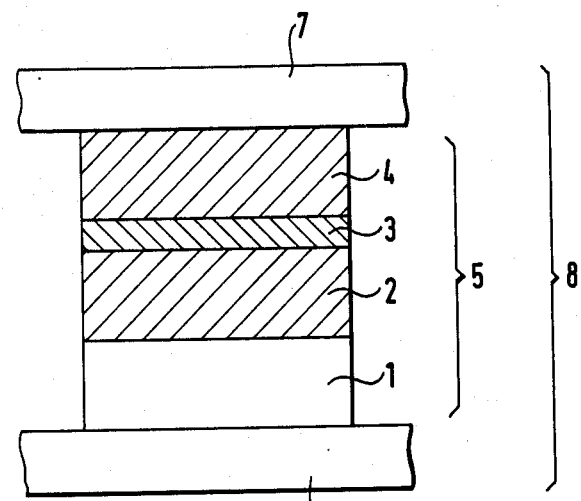
FIG. 2 shows a cross-section through a plastic laminate comprising a coated plastic film and, on each side thereof, laminated polyvinyl butyral films.

FIG. 2 shows a cross-section of a plastic laminate 8 which is composed of a coated plastic film 5, as shown in FIG. 1, and two films 6 and 7 each of polyvinyl butyral, which are each laminated to one side of the plastic film 5. Such polyvinyl butyral films (PVB films) are known to the state of the art and are therefore not described in more detail. Bonding between the PVB films 6 and 7 and the coated plastic film 5 can be effected by suitable transparent adhesives which are not shown in FIG. 2. The thickness of the individual PVB film 6 or 7 is in the range of from 0.2 to 0.4 mm, so that the overall thickness of the plastic laminate 8 reaches 0.85 mm as a maximum.

In the cases where slight reductions in the reflectance of the coated plastic film 5 still allow the requirements to be met, the first metal nitride layer 2 can be omitted.

Figure 3:
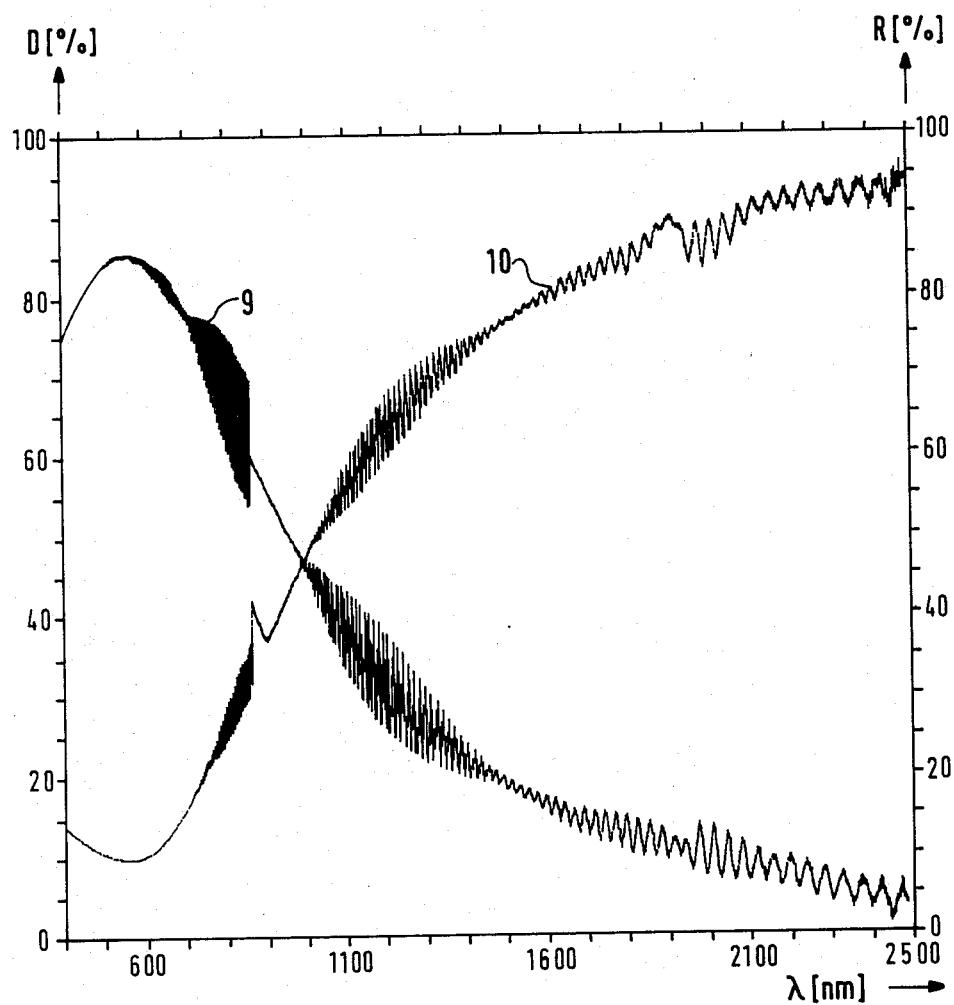
FIG. 3 shows the light transmission and reflection of a coated plastic film of carrier film/aluminum nitride/silver/aluminum nitride structure, as a function of the wavelength of the incident radiation.

FIG. 3 shows a transmission curve 9 in the wavelength region between 400 and 2,500 nm of a coated plastic film which has a carrier film/aluminum nitride/silver/aluminum nitride layer structure. The maximum of the transmission curve is at a wavelength length of 550 nm and amounts to 86%. The reflection curve 10 shows that the maximum of reflection at a wavelength of 2,500 nm is over 90%. The thickness of the carrier film of polyethylene terephthalate (Hostaphan ®4400 from Hoechst AG) is 36 μm.

EXAMPLES

The following Example illustrates the practice and advantages of the present invention. This Example is intended to be illustrative only, and in no event constitutes a limitation upon the scope of the invention.

The three layers 2 to 4 according to the drawing in FIG. 1 were applied to a polyethylene terephthalate film 1 of 36 μm thickness in a cathodic sputtering unit. The aluminum was sputtered in a nitrogen atmosphere, so that the layers 2 and 4 were precipitated as aluminum nitride layers. The sputtering of silver was carried out in an unreactive atmosphere and gave the silver layer 3. The two aluminum nitride layers 2 and 4 and the silver layer 3 have a total layer thickness of 96 nm. The optical properties of the cated plastic film 5 are shown in FIG. 3, the transmission at a wavelength of 550 nm being 86% and the reflection at a wavelength of 2,500 nm being more than 90%. The spectral behavior of the coated plastic film 5 in the wavelength region from 400 to 2,500 nm is evident from the transmission curve 9 and the reflection curve 10 in FIG. 3.

The dielectric layers comprised of silicon nitride which is obtained by sputtering silicon in a nitrogen atmosphere in the cathodic sputtering unit give similarly high values of transmission and reflection.

At greater thicknesses of the metal nitride layer and metal layer, the transmission and reflection will decrease, but the thicknesses of the layers should be selected such in each case that the transparency of the coated plastic film in the visible spectral region for a wavelength of 550 nm is greater than or equal to 73% and the reflectance in the near infrared region for a wavelength of 2,500 nm is at least 80%.

Since nitrides form very smooth surfaces, as is known, plastic films coated in this way provide very high resistance to salt water and other aggressive atmospheres. Moreover, the water absorption of such films over prolonged periods is very low, so that the plastic films are stable on storage.

We claim:

1. A coated plastic film possessing a high transmittance for visible light and high reflectance for infrared radiation comprising a transparent plastic carrier film having a transparent heat reflection layer on at least one surface, said transparent heat reflection layer consisting of:
   (a) a first dielectric layer adherent to the surface of said carrier film, said first dielectric layer comprising a nitride;
   (b) a heat reflection metallic layer adherent to said first dielectric layer; and
   (c) a second dielectric layer adherent to said heat reflection metallic layer, said second dielectric layer comprising a nitride; said first and second dielectric layers are selected from the group consisting of aluminum nitride and silicon nitride.

2. The coated film of claim 1 possessing a transparency of at least 73% for a wavelength of 550 nm and a reflectance of at least 80% for a wavelength of 2,500 nm.

3. The coated film of claim 1 wherein said dielectric layers and said heat reflection metallic layer are each applied successively to said carrier film by cathodic sputtering.

4. The coated plastic film of claim 1 wherein said heat reflection metallic layer comprises a metal selected from the group consisting of silver, gold, and copper.

5. The coated plastic film of claim 4 wherein said heat reflection metal layer has a thickness in the range of from 5 to 40 nm and the thickness of each of said dielectric layers is in the range of from 20 to 60 nm.

6. The coated film of claim 1 wherein said carrier film comprises a polyethylene terephthalate film having a thickness of from 5 to 250 μm.

7. The coated film of claim 6 wherein the thickness of said polyethylene terephthalate film is in the range of from 5 to 50 μm.

8. A plastic laminate possessing a high transmittance for visible light and high reflectance for infrared radiation comprising two layers of polyvinyl butyral separated by a transparent plastic carrier film having a transparent heat reflection layer on at least one surface, said transparent heat reflection layer consisting of
   (a) a first dielectric layer adherent to the surface of said carrier film, said first dielectric layer comprising a metal nitride;
   (b) a heat reflection metallic layer adherent to said first dielectric layer; and
   (c) a second dielectric layer adherent to said heat reflection metallic layer, said second dielectric layer comprising a metal nitride.

9. The plastic laminate of claim 8 wherein the individual thickness of each polyvinyl butyral film is in the range of from 0.2 to 0.8 mm.

10. A laminated safety glass pane comprising two glass panes separated by the plastic laminate of claim 8.

* * * * *